(12) United States Patent
Lee et al.

(10) Patent No.: US 7,911,098 B2
(45) Date of Patent: Mar. 22, 2011

(54) VIBRATION MOTOR

(75) Inventors: Kyoung-Ho Lee, Suwon-si (KR);
Jun-Kun Choi, Suwon-si (KR);
Jae-woo Jun, Suwon-si (KR);
Hwa-Young Oh, Seoul (KR);
Kwang-Hyung Lee, Suwon-si (KR);
Je-Hyun Bang, Suwon-si (KR);
Seok-Jun Park, Suwon-si (KR);
Yong-Jin Kim, Suwon-si (KR);
Seung-Heon Han, Seoul (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 0 days.

(21) Appl. No.: 12/638,551

(22) Filed: Dec. 15, 2009

(65) Prior Publication Data

US 2011/0006618 A1    Jan. 13, 2011

(30) Foreign Application Priority Data

Jul. 7, 2009   (KR) .................. 10-2009-0061749

(51) Int. Cl.
*H02K 7/06* (2006.01)
*H02K 35/00* (2006.01)
*H02K 33/00* (2006.01)
*H02K 11/00* (2006.01)

(52) U.S. Cl. ............... 310/81; 310/20; 310/25; 310/29; 310/71

(58) Field of Classification Search ........... 310/58–59, 310/61, 64, 20, 29, 36, 81, 25
See application file for complete search history.

(56) References Cited

U.S. PATENT DOCUMENTS

| 6,476,702 | B1 | 11/2002 | Hartwig et al. |
| 6,991,217 | B2 * | 1/2006 | Shimizu et al. ............ 251/284 |
| 2004/0169425 | A1 | 9/2004 | Aihara |
| 2009/0096299 | A1 | 4/2009 | Ota et al. |

FOREIGN PATENT DOCUMENTS

| CN | 201315538 | | 9/2009 |
| JP | 10146035 A | * | 5/1998 |
| JP | 2002200460 A | * | 7/2002 |
| JP | 2004-305865 | | 11/2004 |

OTHER PUBLICATIONS

Machine Translation JP2002200460 (2002) and JP10146035 (1998).*
United Kingdom Office Action issued in United Kingdom Patent Application No. GB0922676.2, mailed Apr. 1, 2010.

* cited by examiner

*Primary Examiner* — Quyen Leung
*Assistant Examiner* — Jose A Gonzalez Quinones
(74) *Attorney, Agent, or Firm* — McDermott Will & Emery LLP

(57) ABSTRACT

A linear vibrator is disclosed. The linear vibrator includes a base, a coil unit, which is coupled to the base, a magnet, which is coupled to the coil unit such that the magnet can move relatively, and a plurality of leaf springs, which are interposed between the magnet and the base. Here, the plurality of leaf springs face one another and are coupled to one another Thus, the linear vibrator can increase the range of vibration displacement in a structure and increase the amount of vibration in the linear vibrator. Also, even though the linear vibrator becomes thinner, the range of displacement can be increased because the weight is vibrated horizontally.

9 Claims, 13 Drawing Sheets

VIBRATION MOTOR

CROSS-REFERENCE TO RELATED APPLICATIONS

This application claims the benefit of Korean Patent Application No. 10-2009-0061749, filed with the Korean Intellectual Property Office on Jul. 7, 2009, the disclosure of which is incorporated herein by reference in its entirety.

BACKGROUND

1. Technical Field

The present invention relates to a linear vibrator.

2. Description of the Related Art

A linear vibrator is a part that converts electrical energy into mechanical vibrations by using the principle of generating electromagnetic forces, and is commonly installed in a mobile phone to generate a soundless vibrating alert. With the rapid expansion of mobile phone markets and increased functionalities added to the mobile phone, mobile phone parts are increasingly required to be smaller and better. As a result, there has been an increased demand for the development of a new structure of linear vibrator that can improve the shortcoming of conventional linear vibrators and effectively improve the quality.

As mobile phones having a bigger LCD screen have become popular for the past few years, there have been an increasing number of mobile phones adopting a touch-screen method, by which vibration is generated when the screen is touched. Touch-screens particularly require that the linear vibrator has a greater durability due to a greater frequency of generating vibration in response to the touch compared to the vibration bell for incoming calls and that the vibration has a faster response to the touch made on the touch screen, in order to provide a user a great satisfaction from sensing the vibration when touching the touch screen.

The conventional linear vibrator commonly used in mobile phones generates a rotational force to cause mechanical vibrations by rotating an eccentric (unbalanced) weight. The rotational force is generated by supplying an electric current to the coil of a rotor through point contacts between a brush and a commutator by way of rectifying action.

However, the brush type structure using such commutator has a shorter motor life due to mechanical friction and electrical sparks, which cause wear and black powder, between the brush and the commutator when the motor rotates. Moreover, when voltage is supplied to the motor, it takes time to reach the target amount of vibration by the rotational inertia of the motor. Thus, it is difficult to implement the vibration appropriate for touchscreen phones.

Commonly used to overcome the drawbacks of shorter life time and slower responsiveness in the vibrating functionality of touchscreen phones is a linear vibrator. The linear vibrator does not use the principle of rotating of a motor but uses an electromagnetic force having a predetermined resonant frequency to generate vibrations by use of a spring installed in the vibrator and a mass coupled to the spring. Here, the electromagnetic force is generated through an interactive reaction between a magnet, which is placed on the moving mass, and a direct or alternating current having a particular frequency flowing through a coil, which is placed on a stationary part.

The linear vibrator commonly employed in a high-end touchscreen phone is placed generally near the corner of the mobile phone to generate the vibration in a direction perpendicular to the LCD screen. The linear vibrator may have dimensions of 10 mm in external diameter and 4 mm in thickness. However, in the linear vibrator, which is designed to vibrate in the perpendicular direction, the mass installed in the linear vibrator is required to secure a vertical displacement within 4 mm of space so as to generate vibrations, so that the space limitation becomes much significant and increasing the amount of vibration may be restricted.

SUMMARY

The present invention provides a linear vibrator with a simple structure that can increase the amount of vibration.

An aspect of the present invention provides a linear vibrator that includes a base, a coil unit, which is coupled to the base, a magnet, which is coupled to the coil unit such that the magnet can move relatively, and a plurality of leaf springs, which are interposed between the magnet and the base. Here, the plurality of leaf springs face one another and are coupled to one another.

The leaf spring can include a first frame, a plurality of plate-shaped members, which have one end part thereof extended towards an inner side of the first frame, and a second frame, which is coupled to the other end part of the plurality of plate-shaped members. Here, the first frame has a rectangular shape, and the plurality of plate-shaped members are extended towards a lengthwise direction of the first flame.

The plurality of leaf springs are coupled in such a way that the plurality of leaf springs are deformed in a same direction, and the plurality of plate-shaped members are extended spirally.

The leaf springs can be interposed between either end of the magnet and the base, the coil unit can have a hollow part formed therein, and the magnet can be inserted into the hollow part.

The linear vibrator can be coupled to the hollow part of the coil unit in such a way that the coil unit is coupled to the base, and further include a bobbin into which the magnet is inserted. The magnet can be inserted into the bobbin such that the magnet can move horizontally.

The linear vibrator can further include a weight, which is coupled to the magnet. The linear vibrator can further include a yoke, which is interposed between the magnet and the weight, and surround the magnet.

Additional aspects and advantages of the present invention will be set forth in part in the description which follows, and in part will be obvious from the description, or may be learned by practice of the invention.

DETAILED DESCRIPTION

Figure 1:
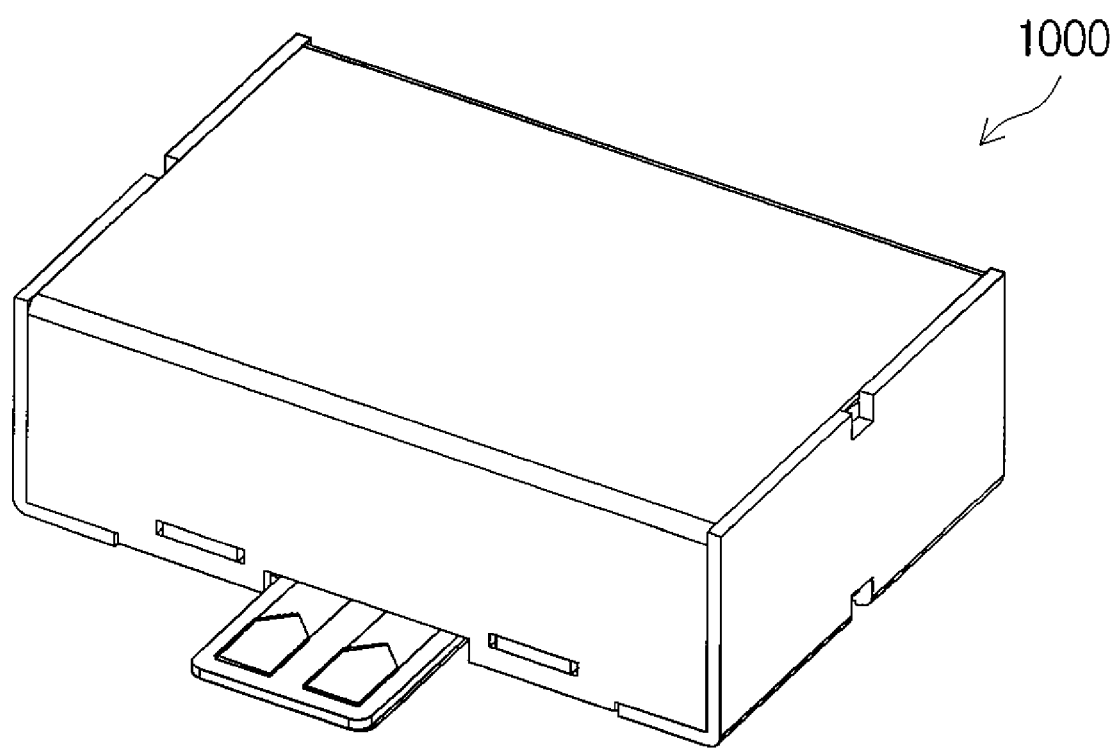
FIG. 1 is a perspective view of a linear vibrator in accordance with an embodiment of the present invention.

The features and advantages of this invention will become apparent through the below drawings and description.

A linear vibrator according to certain embodiments of the present invention will be described below in more detail with reference to the accompanying drawings. Those components that are the same or are in correspondence are rendered the same reference numeral regardless of the figure number, and redundant descriptions are omitted.

Figure 2:
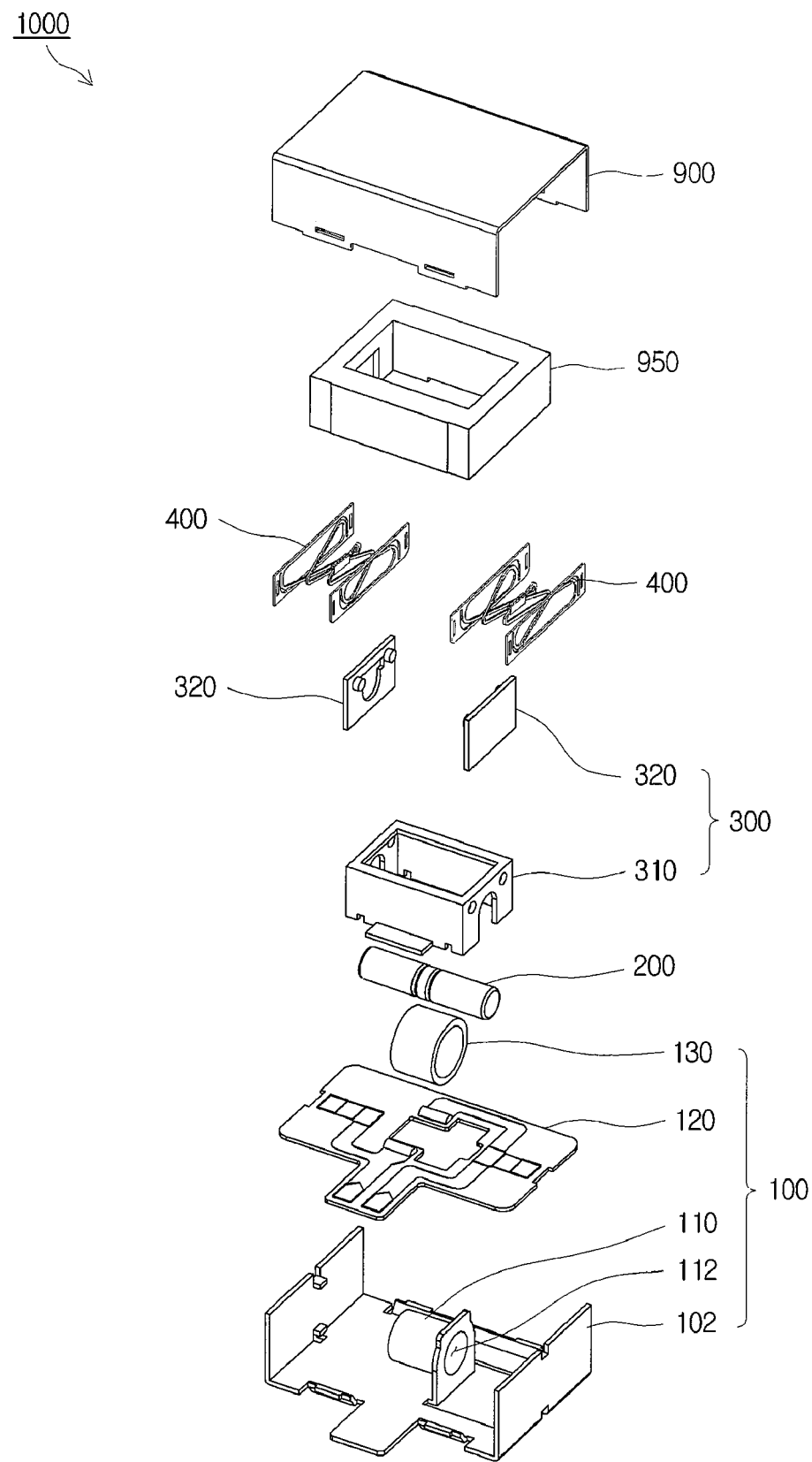
FIG. 2 is an exploded perspective view of a linear vibrator in accordance with an embodiment of the present invention.

FIG. 1 is a perspective view of a linear vibrator 1000 in accordance with an embodiment of the present invention, and FIG. 2 is an exploded perspective view of a linear vibrator 1000 in accordance with an embodiment of the present invention. As illustrated in FIGS. 1 and 2, a linear vibrator 1000 according to an embodiment of the present invention includes a base 102, a coil unit 130, a magnet 200, a weight 950 and a leaf spring assembly 400. Thus, the linear vibrator 1000 can increase the range of vibration displacement in a structure and increase the amount of vibration in the linear vibrator 1000. Also, even though the linear vibrator 1000 becomes thinner, the range of displacement can be increased because the weight 950 is vibrated horizontally.

The base 102, in which the components of the linear vibrator 1000 are housed, has a space that supports the components of the linear vibrator 1000. A bobbin 110 can be formed at the center of the base 102. A case 900 covers the upper side of the base 100 and forms the exterior of the linear vibrator 1000.

Figure 3:
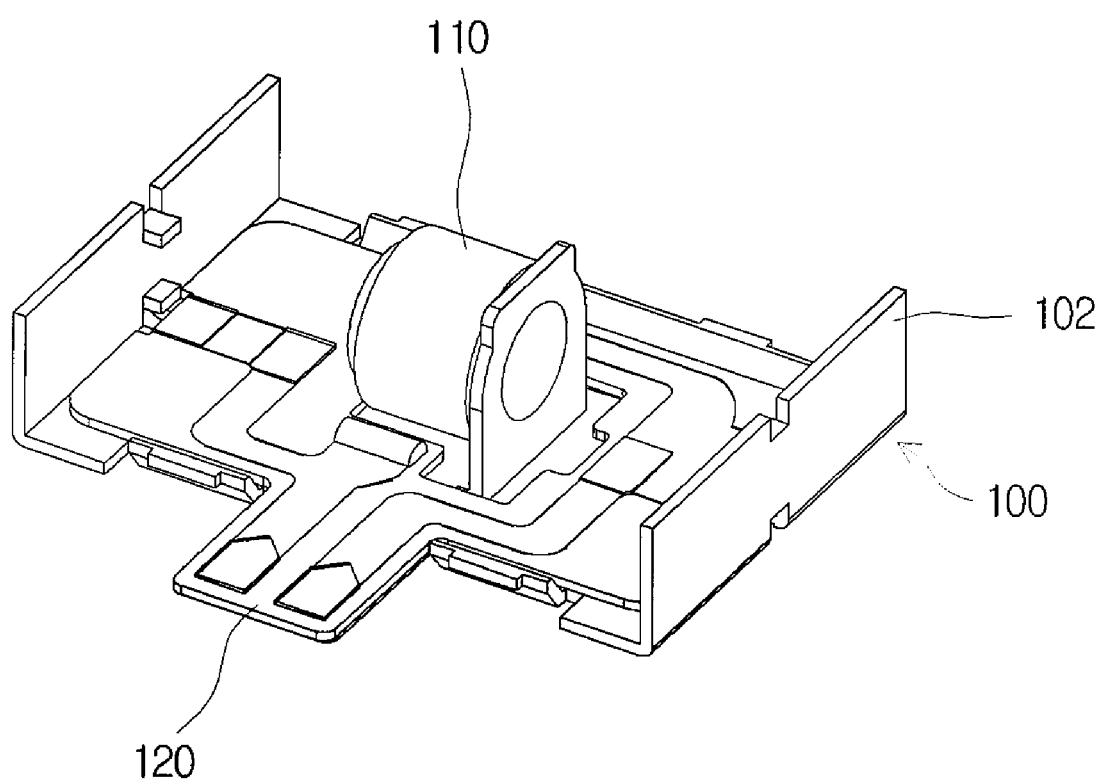
FIG. 3 is a perspective view illustrating a coil assembly of a linear vibrator in accordance with an embodiment of the present invention.

A substrate 120 is a part that provides electrical connection to the coil unit 130, which will be described later. A circuit pattern can be formed on one surface of the substrate 120. FIG. 3 is a perspective view of a coil assembly in a linear vibrator according to an embodiment of the present invention. As illustrated in FIG. 3, the substrate 120 is installed on the base 102, and the bobbin 110 can be exposed towards the upper side of the substrate 120 through an opening formed at the center of the substrate 120.

The bobbin 110 is a part that can support the coil unit 130. The bobbin 110 can be arranged in the left-to-right direction of the base 102. The bobbin 110 can have a cylindrical shape having a hollow part 112 formed therein.

The coil unit 130 has a cylindrical shape having a hollow part formed therein with a coil being wound on the cylindrical shape. By inserting the bobbin 110 into the hollow part of the coil unit 130, the coil unit 130 can be installed on the base 102. As such, a coil assembly 100 can be constituted by assembling the base 102, the bobbin 110, the coil unit 130 and the substrate 120.

The magnet 200 has a cylinder shape extended lengthwise. By being inserted into the hollow part of the bobbin 110, the magnet 200 can move horizontally in the hollow part of the bobbin 110.

Since the magnet 200 can be move horizontally with respect to the base 102, the magnet 200 can be provided with a sufficient horizontal moving space although the linear vibrator 1000 is made thinner.

Although it is shown in the present embodiment that the bobbin 110 formed on the base 102 forms the supporting structure of the coil unit 130, it is also possible that the coil unit 130 can directly installed on the base 102 without having an additional supporting structure, depending on its relative location relationships with the magnet 200 or the movement direction of the magnet 200.

Figure 4:
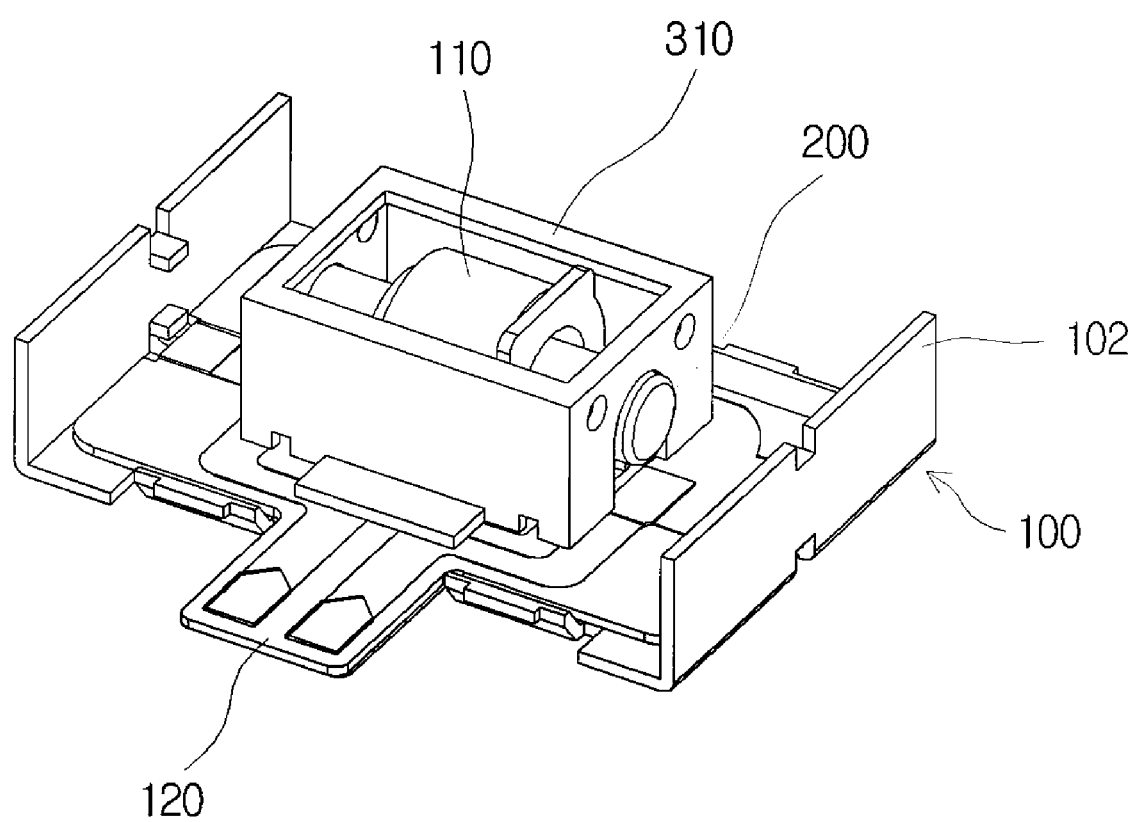
FIGS. 4 to 6 are perspective views illustrating assembling of a linear vibrator in accordance with an embodiment of the present invention.
Figure 5:
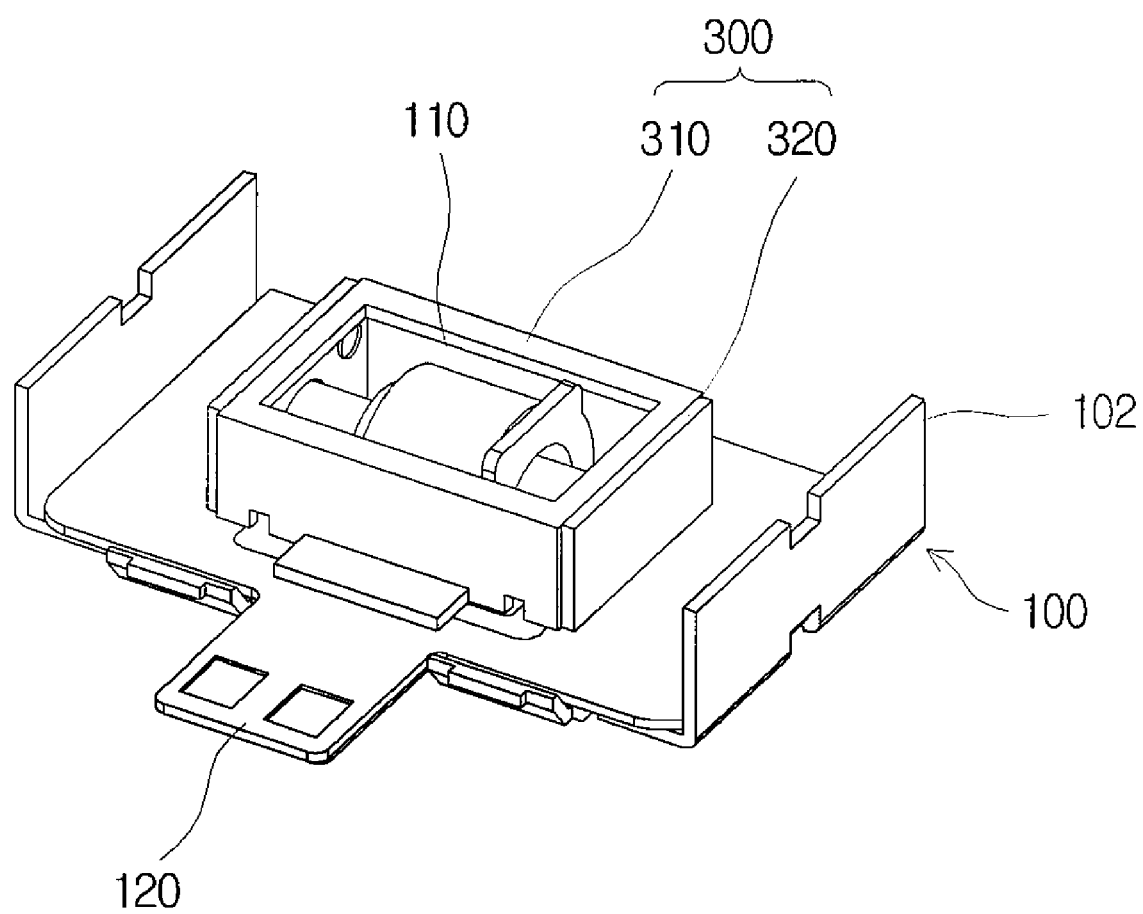
Figure 6:
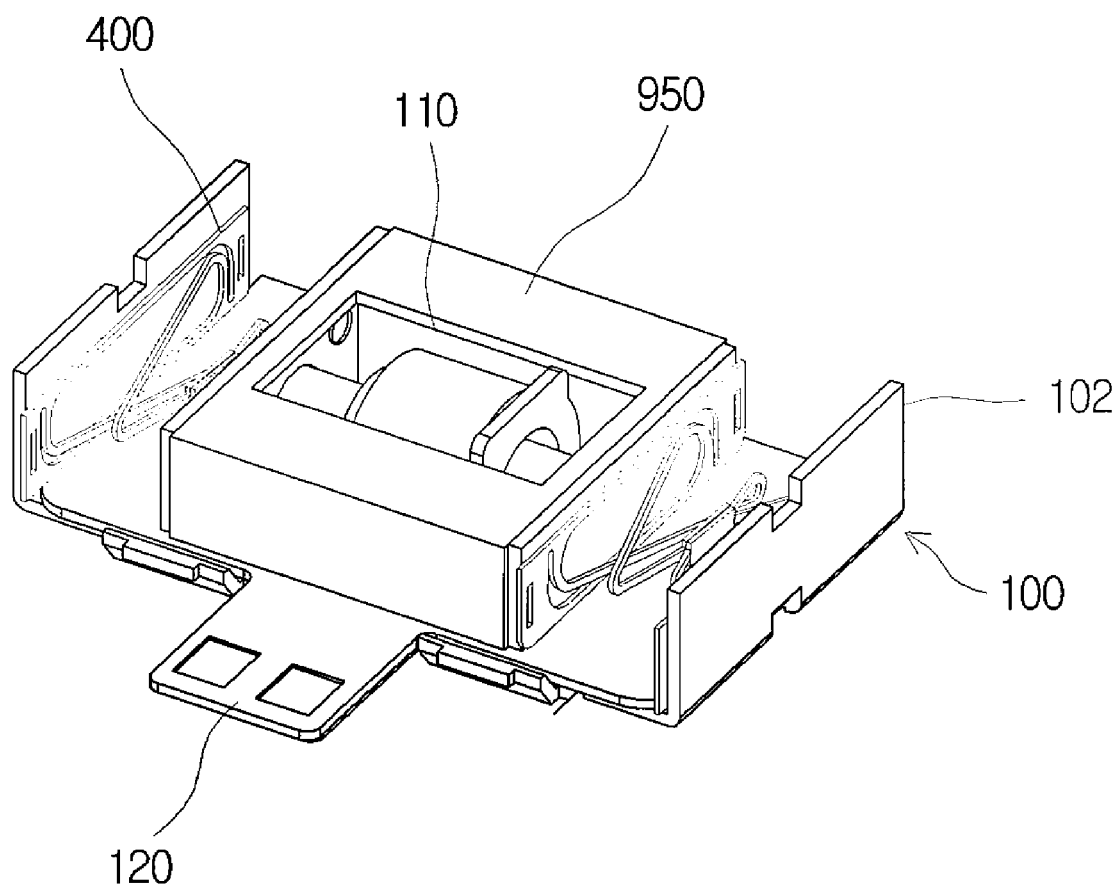

Furthermore, although it is shown in the present embodiment that the coil unit 130 has a hollow part formed therein, and the magnet 200 is inserted into the hollow part so that the magnet 200 can move relatively against the coil unit 130, it is also apparent that the shape of the coil unit 130 can be changed, and the coil unit 130 and the magnet 200, for example, have a flat shape and face each other FIGS. 4 to 6 are perspective views illustrating assembling of a linear vibrator according to an embodiment of the present invention. As illustrated in FIGS. 1, 4 and 5, a yoke 300 can prevent the leakage of magnetic flux of the magnet 200 and converge the magnetic flux.

The yoke 300 includes a cover yoke 310 and a back yoke 320. The cover yoke 310 can be shaped as a rectangular cuboid generally surrounding the magnet 200. The back yoke 320 can be coupled to both ends of the magnet 200 and the cover yoke 310.

As illustrated in FIG. 6, the weight 950 is a rectangular cuboid generally surrounding the yoke 300. The weight 950 is installed outside the magnet 200 and the yoke 300 and can generate vibrations through its repetitive horizontal movement with the magnet 200.

Because of the structure in which the weight 950 can move horizontally, the linear vibrator 1000 can be made thinner, and the amount of vibration can be increased due to the horizontally-shaped space formed in the linear vibrator 1000.

Figure 7:
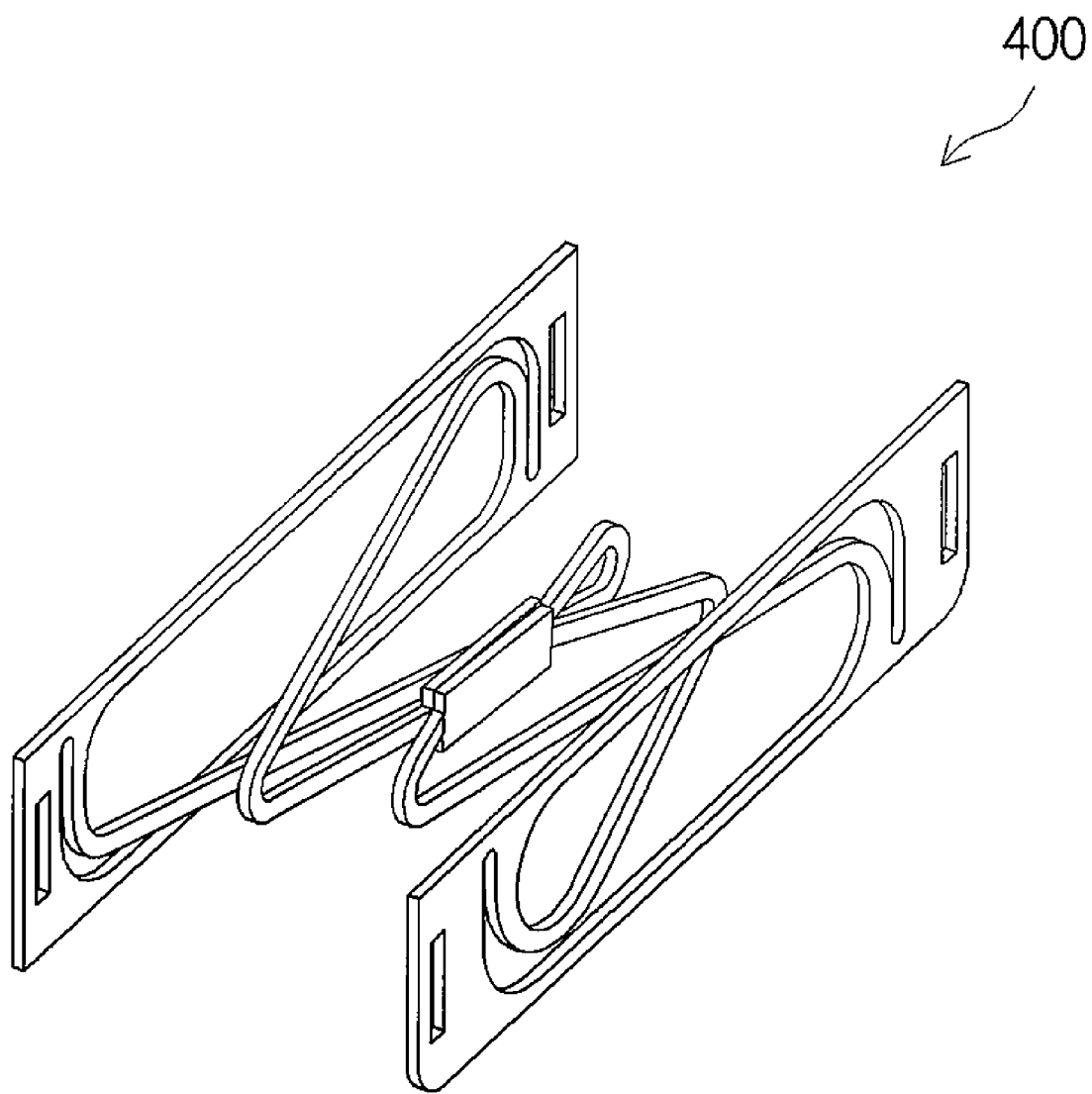
FIG. 7 is a perspective view illustrating a leaf spring assembly of a linear vibrator in accordance with an embodiment of the present invention.
Figure 8:
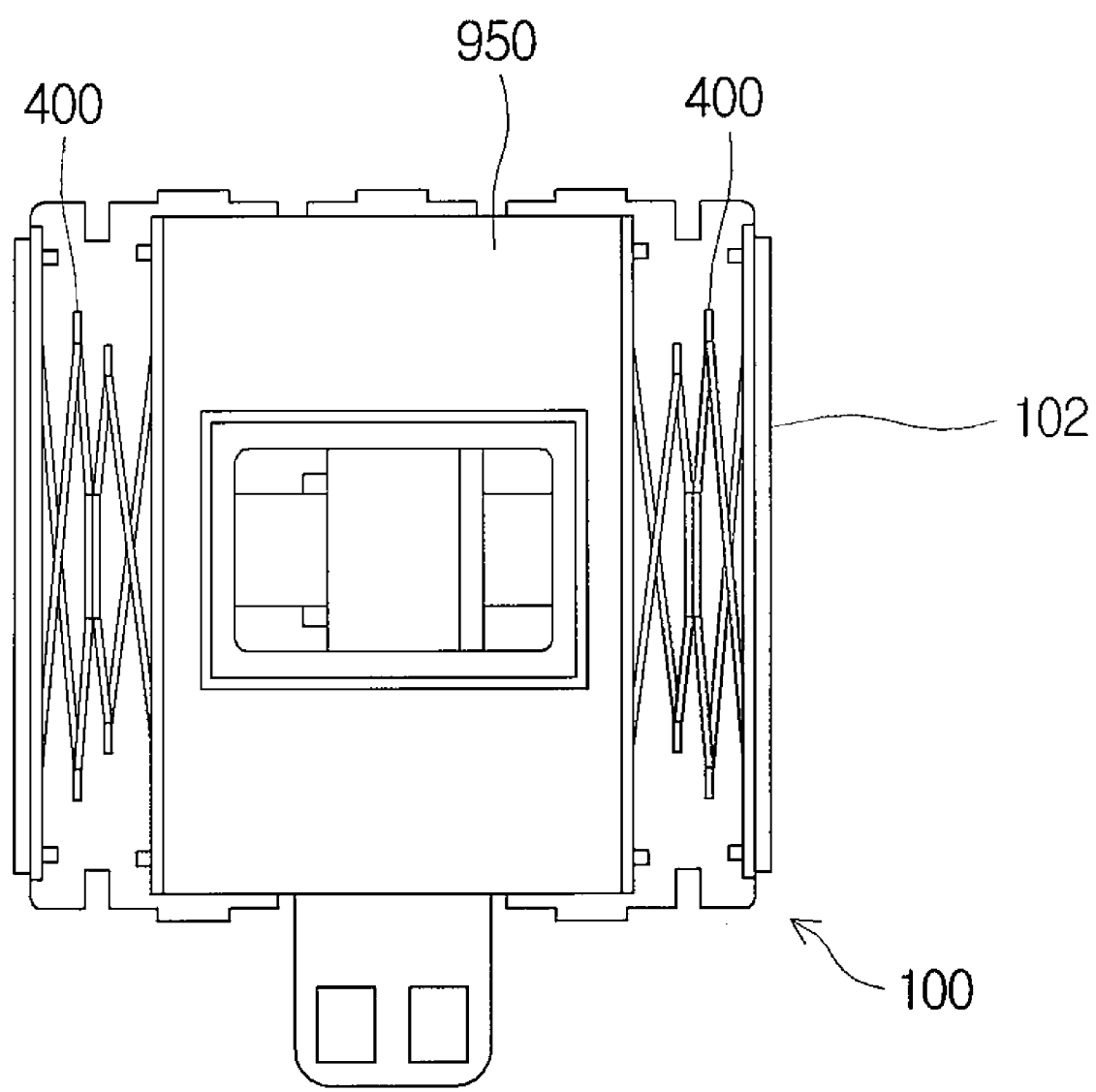
FIG. 8 is a plan view illustrating an assembled state of a linear vibrator in accordance with an embodiment of the present invention.
Figure 9:
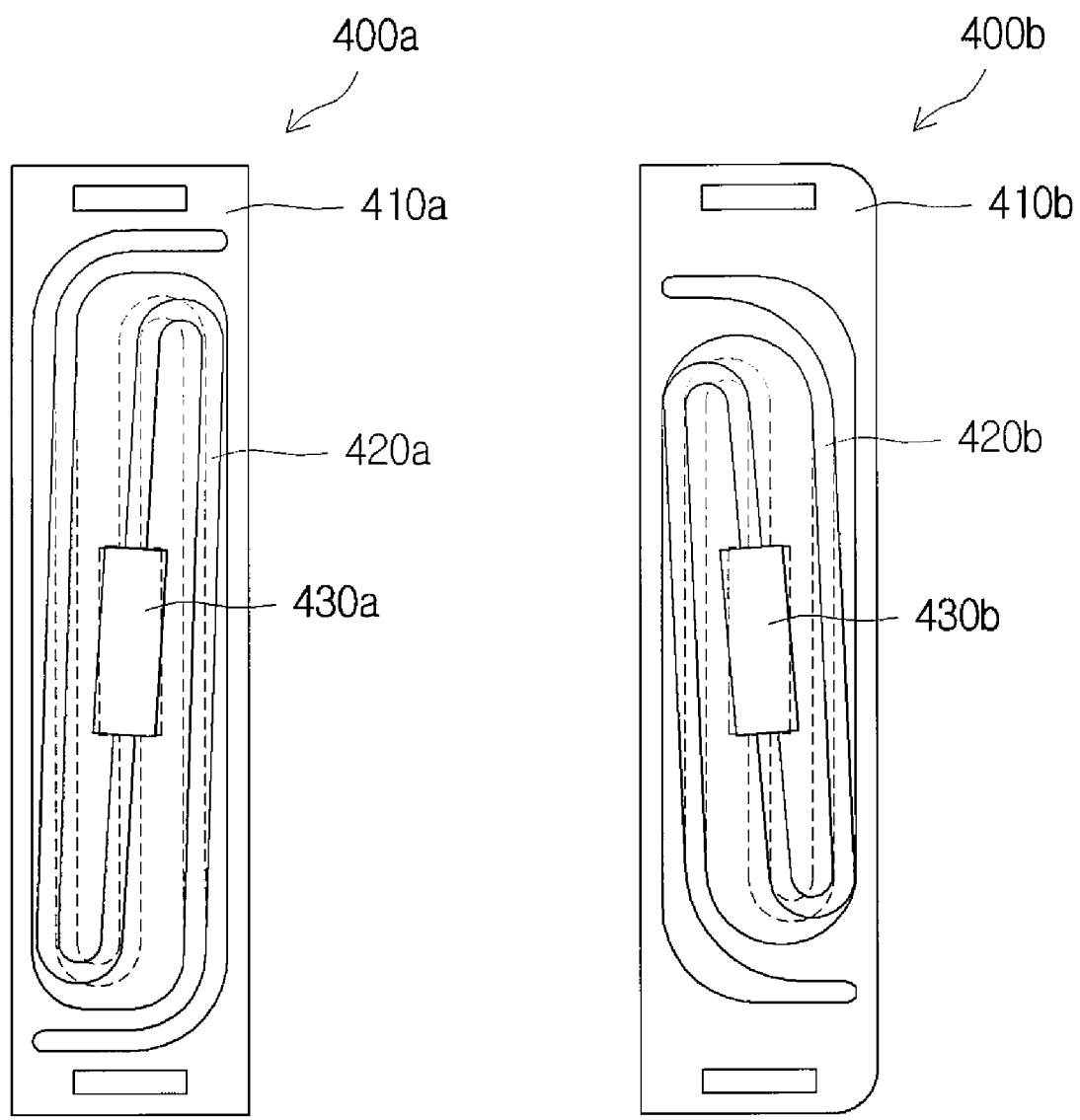
FIG. 9 is a plan view illustrating a leaf spring of a linear vibrator in accordance with an embodiment of the present invention.

FIG. 7 is a perspective view illustrating a leaf spring assembly 400 of a linear vibrator 1000 according to an embodiment of the present invention, and FIG. 8 is a plan view illustrating spiral-shaped leaf springs 400a and 400b of a linear vibrator 1000 according to an embodiment of the present invention. FIG. 9 is a plan view illustrating the leaf springs 400a and 400b of a linear vibrator 1000 according to an embodiment of the present invention.

As illustrated in FIGS. 7, 8 and 9, a leaf spring assembly 400 has two leaf springs 400a and 400b, which face each other and are coupled to each other. Each of the leaf springs 400a and 400b includes a first frame 410a and 410b, a plate-shaped member 420a and 420b and a second frame 430a and 430b.

The first frames 410a and 410b have a rectangular shape corresponding to the cross section of the side of the linear vibrator 1000. The first frames 410a and 410b can have a ring shape in the form of a rectangle, and thus the leaf springs 400a and 400b have a rectangular shape and can be formed by way of press-processing an elastic plate-shaped member.

The plate-shaped members 420a and 420b are positioned between the first frames 410a and 410b. One end part of each of the plate-shaped members 420a and 420b is spirally extended from the inner side of the first frames 410a and 410b, respectively. Here, the plate-shaped members 420a and 420b can have a spiral-shape extended towards a longer side of the first frames 410a and 410b in accordance with the shape of the first frames 410a and 410b.

Two plate-shaped members are extended from either side of the first frames 410a and 410b in such a way that the plate-shaped members 420a and 420b are symmetrically formed in the first frames 410a and 410b.

The plate-shaped members 420a and 420b are parts that actually provide the elasticity of the leaf springs 400a and 400b. By having a spiral shape, the plate-shaped members 420a and 420b can have an extended form. Also, the modulus of elasticity of the leaf springs 400a and 400b can be adjusted by modifying the length of the plate-shaped members 420a and 420b.

FIG. 8 is a plan view illustrating an assembled state of a linear vibrator 1000 according to an embodiment of the present invention. As illustrated in FIGS. 7 and 8, the other end parts of the plate-shaped members 420a and 420b are coupled to both ends of the second frames 430a and 430b. The second frames 430a and 430b are parts where the end parts of the two plate-shaped members are coupled to each other, and can be supported elastically by the two plate-shaped members. In the present embodiment, the second frames 430a and 430b are parts that are in contact with each other when the leaf springs 400a and 400b, facing each other, are coupled to each other.

By having the two leaf springs 400a and 400b face each other and coupled to each other, the modulus of elasticity of the leaf spring assembly 400 can be smaller than each of the leaf springs 400a and 400b. Accordingly, the leaf springs 400a and 400b having an even greater modulus of elasticity can be used, and thus a wider variety of modulus of elasticity of the leaf springs 400a and 400b can be selected when designing the linear vibrator 1000, ultimately improving the design freedom.

Furthermore, since the leaf springs 400a and 400b having a greater modulus of elasticity can be used, even thicker plate-shaped members 420a and 420b can be used. As a result, the stiffness of the plate-shaped members 420a and 420b can be increased, facilitating the process of manufacturing the leaf springs 400a and 400b. Thus, it is easier to handle the leaf springs 400a and 400b during the manufacturing process, thereby effectively reducing the dispersion of the modulus of elasticity of the leaf springs 400a and 400b.

Also, since two leaf springs 400a and 400b are used, the range of displacement that the leaf spring assembly 400 has can be increased so that the amount of vibration in the linear vibrator 1000 can also be increased.

Also, this arrangement reduces the range of displacement in each of the leaf springs 400a and 400b so that the modulus of strain of the plate-shaped members 420a and 420b in the leaf springs 400a and 400b can be decreased. As a result, the stresses within the plate-shaped members 420a and 420b can be decreased, and thus the life time of the leaf springs 400a and 400b and the linear vibrator 1000 can be extended.

As illustrated in FIG. 9, when the leaf springs 400a and 400b are deformed by an external force, the second frames 430a and 430b can be rotated in a particular direction. The two leaf springs 400a and 400b, which face each other, can be coupled to each other in such a way that the second frames 430a and 430b can be rotated in a same direction when a deformation occurs.

With this arrangement, the leaf spring assembly 400 can prevent stresses within the plate-shaped members 420a and 420b that may otherwise occur due to the difference in rotating direction of the second frames 430a and 430b when the leaf springs 400a and 400b are deformed. Then, while the leaf spring assembly 400 undergoes a displacement between an undeformed configuration and a deformed configuration, the second frames 430a and 430b of the leaf springs 400a and 400b can be deformed in a same direction so that the first frames 410a and 410b are not rotated.

Therefore, while the leaf spring assembly 400 undergoes deformation, the first frames 410a and 410b, which are the end parts of the leaf spring assembly 400, can be prevented from rotating so that the weight 950 can travel straight during the vibration of the weight 950.

Figure 10:
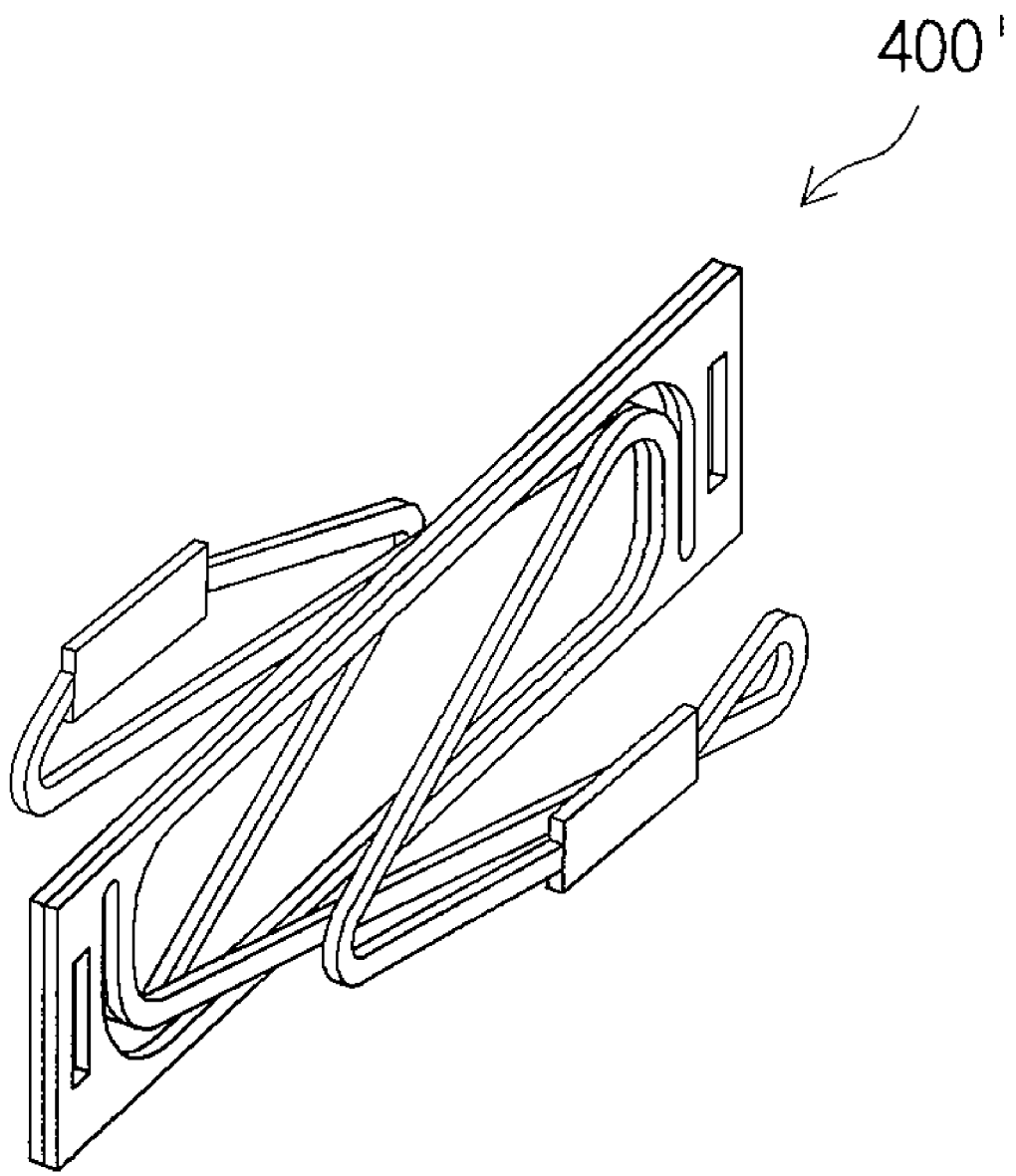
FIG. 10 is a perspective view illustrating a modification of a leaf spring assembly of a linear vibrator in accordance with an embodiment of the present invention.

FIG. 10 is a perspective view illustrating a modification 400' of a leaf spring assembly of a linear vibrator 1000 according to an embodiment of the present invention. As illustrated in FIG. 10, unlike the leaf spring assembly 400 according to an embodiment of the present invention, the modification 400' of a leaf spring assembly can have the first frames 410a and 410b being in contact with each other, and the two leaf springs 400a and 400b, which face each other, can be coupled to each other, in which the first frames 410a and 410b are positioned in between.

Here, the second frames 430a and 430b, which are placed on both ends of the leaf spring assembly 400', of the two leaf springs 400a and 400b can be positioned between the base 102 and the weight 950 and can elastically support the weight 950.

Figure 11:
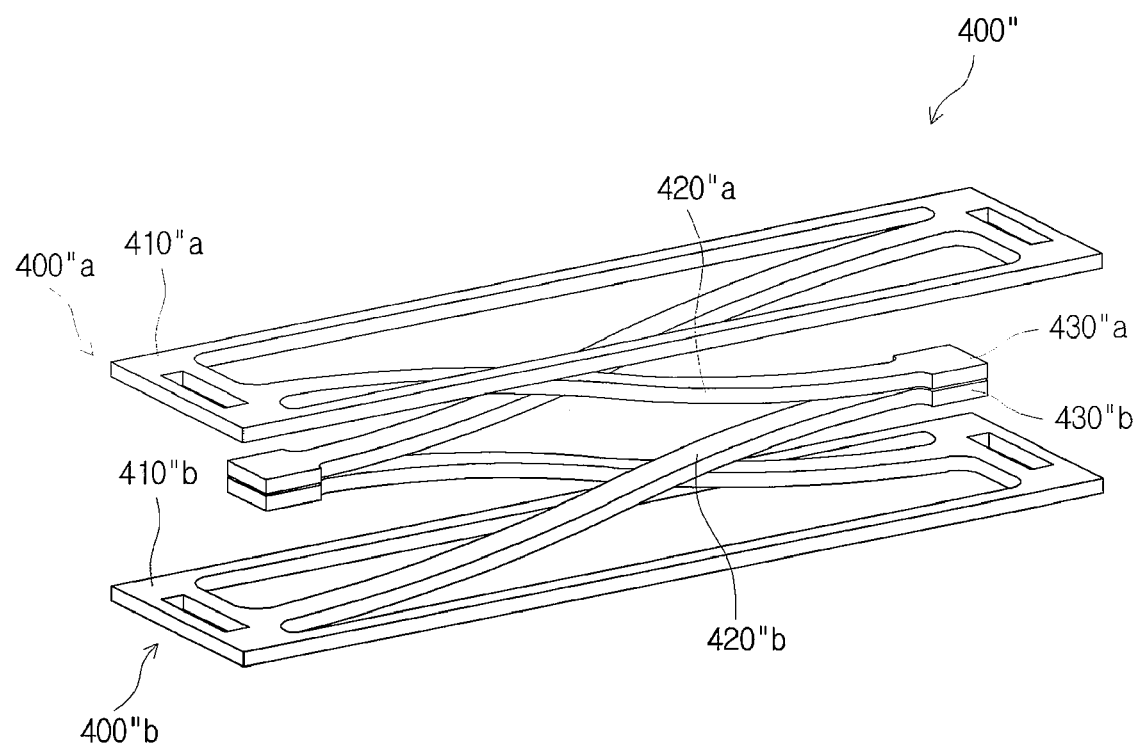
FIG. 11 is a perspective view illustrating another modification example of a leaf spring assembly of a linear vibrator in accordance with an embodiment of the present invention.
Figure 12:
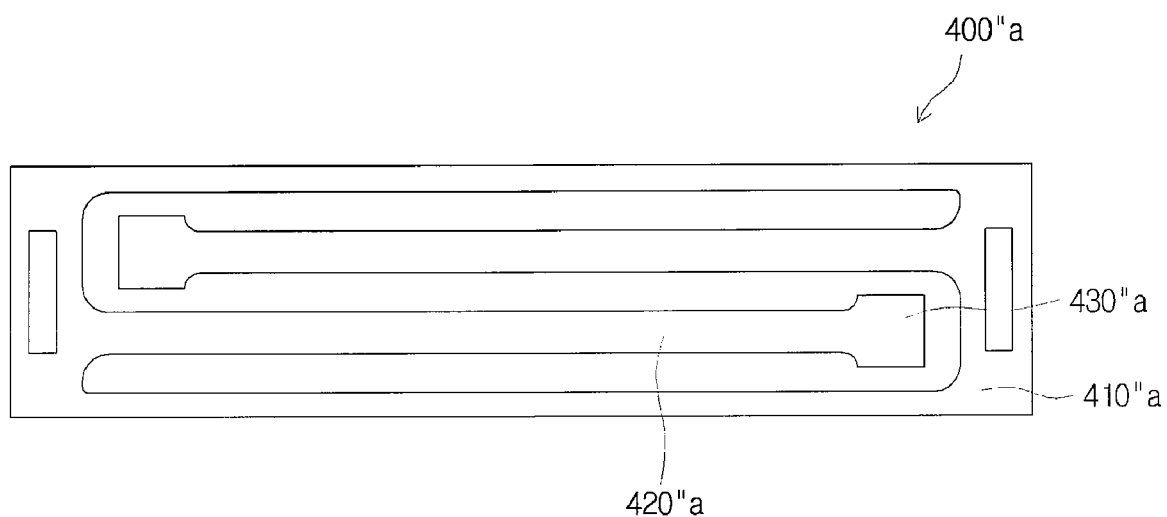
FIG. 12 is a plan view illustrating another modification example of a leaf spring assembly of a linear vibrator in accordance with an embodiment of the present invention.
Figure 13:
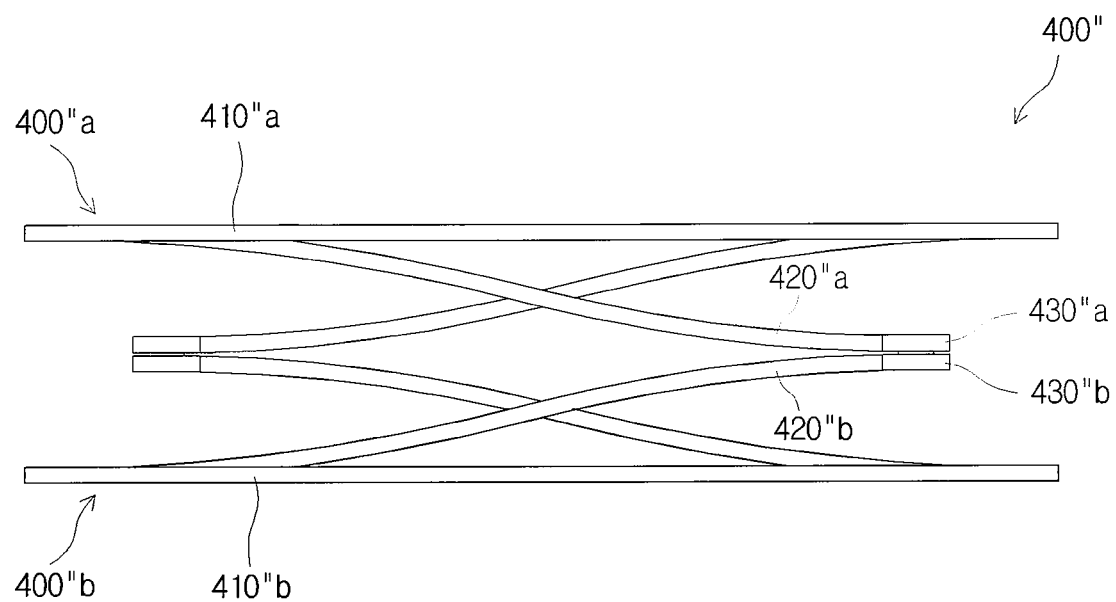
FIG. 13 is a side view illustrating another modification example of a leaf spring assembly of a linear vibrator in accordance with an embodiment of the present invention.

FIG. 11 is a perspective view illustrating another modification example of a leaf spring assembly 400" of a linear vibrator in accordance with an embodiment of the present invention. FIG. 12 is a plan view illustrating another modification example of a leaf spring assembly 400" of a linear vibrator in accordance with an embodiment of the present invention. FIG. 13 is a side view illustrating another modification example of a leaf spring assembly 400" of a linear vibrator in accordance with an embodiment of the present invention.

As illustrated in FIGS. 11 to 13, the leaf spring assembly 400" can include first frames 410"a and 410"b, plate-shaped members 420"a and 420"b and second frames 430"a and 430"b.

The first frames 410"a and 410"b can be formed in an annular shape with a rectangular shape, which has a hollow part formed therein. The plate-shaped members 420"a and 420"b can have a shape extending in a lengthwise direction, be extended from either end side of the inside of the first frames 410"a and 410"b, and be disposed in a lengthwise direction of the first frames 410"a and 410"b so that they can be coupled to an inner portion of the first frames 410"a and 410"b.

The second frames 430"a and 430"b are formed on an end part of the plate-shaped members 420"a and 420"b, and when the leaf springs 400"a and 400"b face each other and are coupled to each other, the second frames 430"a and 430"b are coupled to each other so that the leaf springs 400"a and 400"b can form the leaf spring assembly 400".

The plate-shaped members 420"a and 420"b extended in a lengthwise direction face each other and are coupled to each other so that the leaf spring assembly 400" can extend a length of the elastically deformed portion of the leaf springs 400"a and 400"b. Thus, the lifetime of the leaf springs 400"a and 400"b can be extended by reducing stresses that can be generated while elastically deformed.

Also, elastically deformed portions that are extended in a lengthwise direction (that is, the plate-shaped members 420"a and 420"b) face each other and are coupled to each other so that the straightness of deformation of the leaf spring assembly 400" can be improved while elastically deformed.

While the spirit of the present invention has been described in detail with reference to particular embodiments, the embodiments are for illustrative purposes only and shall not limit the present invention. It is to be appreciated that those skilled in the art can change or modify the embodiments without departing from the scope and spirit of the present invention.

What is claimed is:

1. A linear vibrator comprising:
   a base;
   a coil unit coupled to the base;
   a magnet coupled to the coil unit such that the magnet can move relatively;
   a weight coupled to the magnet; and
   a plurality of leaf springs interposed between either end of the weight and the base,
   wherein the plurality of leaf springs face one another and are coupled to one another,
   wherein the coil unit has a hollow part formed therein, and the magnet is inserted into the hollow part such that the magnet can move horizontally, and
   wherein each leaf spring comprises:
      a first frame;
      a plurality of plate-shaped members having one end part thereof extended towards an inner side of the first frame; and
      a second frame coupled to the other end part of the plurality of plate-shaped members.

2. The linear vibrator of claim 1, wherein the first frame has a rectangular shape, and the plurality of plate-shaped members are extended towards a lengthwise direction of the first flame.

3. The linear vibrator of claim 1, wherein the plurality of leaf springs are coupled in such a way that the plurality of leaf springs are deformed in a same direction.

4. The linear vibrator of claim 3, wherein the plurality of plate-shaped members are extended spirally.

5. The linear vibrator of claim 1, the plurality of leaf springs face one another and are coupled to one another about the second frame.

6. The linear vibrator of claim 1, wherein the plurality of leaf springs face one another and are coupled to one another about the first frame.

7. The linear vibrator of claim 1, wherein the linear vibrator is coupled to the hollow part of the coil unit in such a way that the coil unit is coupled to the base, and further comprises a bobbin into which the magnet is inserted.

8. The linear vibrator of claim 1, wherein the magnet is inserted into a bobbin.

9. The linear vibrator of claim 1, further comprising:
   a yoke interposed between the magnet and the weight and surrounding the magnet.

* * * * *